United States Patent
Jeong et al.

(10) Patent No.: US 11,548,149 B2
(45) Date of Patent: Jan. 10, 2023

(54) METHOD FOR CODING ROBOT CONTROL DEVICE, PROGRAM, AND ROBOT CONTROL DEVICE

(71) Applicant: HANWHA CO., LTD., Seoul (KR)

(72) Inventors: Hae Wook Jeong, Changwon-si (KR); In Zu Kang, Changwon-si (KR); Jong Hwa Park, Changwon-si (KR)

(73) Assignee: Hanwha Co., Ltd., Seoul (KR)

( * ) Notice: Subject to any disclaimer, the term of this patent is extended or adjusted under 35 U.S.C. 154(b) by 107 days.

(21) Appl. No.: 16/811,951

(22) Filed: Mar. 6, 2020

(65) Prior Publication Data
US 2020/0206926 A1 Jul. 2, 2020

Related U.S. Application Data

(63) Continuation of application No. PCT/KR2017/014126, filed on Dec. 5, 2017.

(30) Foreign Application Priority Data

Sep. 29, 2017 (KR) .................. 10-2017-0128319

(51) Int. Cl.
- *G06F 9/44* (2018.01)
- *B25J 9/16* (2006.01)
- *G06F 8/30* (2018.01)
- *G06F 8/34* (2018.01)

(52) U.S. Cl.
CPC .............. *B25J 9/1664* (2013.01); *G06F 8/30* (2013.01); *G06F 8/34* (2013.01)

(58) Field of Classification Search
None
See application file for complete search history.

(56) References Cited

U.S. PATENT DOCUMENTS

| | | | |
|---|---|---|---|
| 6,026,233 A * | 2/2000 | Shulman | G06F 8/33 715/201 |
| 9,311,278 B2 | 4/2016 | Briden et al. | |
| 2002/0095658 A1 | 7/2002 | Shulman et al. | |

(Continued)

FOREIGN PATENT DOCUMENTS

| | | |
|---|---|---|
| JP | 0580830 A | 4/1993 |
| JP | 2010-097426 A | 4/2010 |

(Continued)

OTHER PUBLICATIONS

Chandan Datta et al., "RoboStudio: A visual Programming Environment for Rapid Authoring and Customization of Complex Services on a Personal Service Robot", Oct. 2012 (Year: 2012).*

(Continued)

*Primary Examiner* — Wei Y Zhen
*Assistant Examiner* — Lanny N Ung
(74) *Attorney, Agent, or Firm* — Sughrue Mion, PLLC

(57) ABSTRACT

Provided is a method of coding a robot control device according to a standardized coding format, the method including displaying a format of a syntax to be input in unit of components; with respect to each component in the syntax, displaying one or more candidate component values that are to be input as a value of each component; and completing the syntax based on a user selection on the candidate component values with respect to each component.

15 Claims, 7 Drawing Sheets

(56) References Cited

U.S. PATENT DOCUMENTS

| | | | |
|---|---|---|---|
| 2005/0086635 A1* | 4/2005 | Parikh | G06F 8/34 |
| | | | 717/103 |
| 2010/0162210 A1* | 6/2010 | Briden | G06F 8/33 |
| | | | 717/113 |
| 2012/0167042 A1 | 6/2012 | Tillmann et al. | |
| 2012/0291010 A1 | 11/2012 | Hutchison et al. | |
| 2014/0365932 A1* | 12/2014 | Hwang | G06F 3/04886 |
| | | | 715/768 |
| 2015/0317320 A1* | 11/2015 | Miller | G06F 16/90324 |
| | | | 707/728 |

FOREIGN PATENT DOCUMENTS

| | | |
|---|---|---|
| KR | 10-2001-0011272 A | 2/2001 |
| KR | 10-2003-0012488 A | 2/2003 |
| KR | 10-2013-0053714 A | 5/2013 |
| KR | 10-2014-0006177 A | 1/2014 |
| KR | 10-1350798 B1 | 1/2014 |

OTHER PUBLICATIONS

Communication dated May 19, 2021 issued by the European Patent Office in application No. 17927565.6.

International Search Report (PCT/ISA/210), issued by International Searching Authority in corresponding International Application No. PCT/KR2017/014126, dated Jun. 21, 2018.

Written Opinion (PCT/ISA/237) issued by the International Searching Authority in corresponding International Application No. PCT/KR2017/014126, dated Jun. 21, 2018.

* cited by examiner

METHOD FOR CODING ROBOT CONTROL DEVICE, PROGRAM, AND ROBOT CONTROL DEVICE

TECHNICAL FIELD

The present disclosure relates to a method and computer program for coding a robot control device and the robot control device.

BACKGROUND ART

As technology has developed rapidly, robots perform an important role as tools executing various works instead of human beings. Robots are mainly used in automation of various kinds of works including distribution, assembling, welding, and painting, instead of arms of a person, to contribute to improvement of productivity.

A user codes each operation of a robot in a predetermined language in order for the robot to perform an operation according to the purpose, and coding is generally made through typing.

However, the coding based on the typing increases a possibility of generating errors in inputting a syntax, while enabling a user to freely correct the syntax. For example, when a user enters a variable that is not defined as a variable to be compared, a different variable, or an inappropriate operator, an error occurs.

When such an error occurs as a malfunction of a robot during actual performance, without being detected during a compile process or a debugging process, the error may cause a severe accident or a great loss considering unique characteristics of the robot.

DETAILED DESCRIPTION OF THE INVENTION

Technical Problem

The present disclosure provides a coding method and program of a robot control device and the robot control device, the coding method and program being capable of reducing cases in which syntax is wrongly input, by completing the syntax based on 'selection' of a user, not 'writing' of the user, when inputting main syntaxes.

Also, the present disclosure provides a coding method and program of a robot control device and the robot control device, the coding method and program being capable of performing a coding easily by displaying a predefined variable as a candidate value of a component corresponding to a variable in a syntax, and enabling a user to perform coding of a robot without a particular training, by receiving a selection of each component after providing a syntax format even when the user does not know about rules and grammar of the coding.

Technical Solution

According to one or more embodiments of the disclosure, there is provided a method of coding a robot control device according to a standardized coding format, the method including displaying a format of a syntax to be input in units of components, with respect to each component configuring the syntax, displaying one or more candidate component values to be input as a value of each component, and completing the syntax based on a user selection on the candidate component values with respect to each component.

The syntax to be input may be a syntax corresponding to a comparison expression for comparing values of at least two variables, the component may be one of an operator and a variable, and the operator may be one of comparison operators for comparing the values of the at least two variables.

A format of the syntax corresponding to the comparison expression may include a component corresponding to a first variable, a component corresponding to a comparison operator, and a component corresponding to a second variable.

The displaying of the candidate component values may include displaying at least one variable generated in advance as a candidate component value for the component corresponding to the first variable, displaying at least one comparison operator as a candidate component value for the component corresponding to the comparison operator, and displaying a keypad for inputting a value of the second variable and at least one of two logic values as a candidate component value for the component corresponding to the second variable.

The displaying of the candidate component values may include, from among the candidate component values for the component corresponding to the second variable, displaying only a candidate component value corresponding to a type of the first variable as a candidate component value for the component corresponding to the second variable.

The completing of the syntax may include obtaining a user input with respect to one of the one or more variables generated in advance, the at least one variable being expressed as the candidate component value for the component corresponding to the first variable, obtaining a user input with respect to one of the one or more comparison operators displayed as the candidate component values for the component corresponding to the comparison operator, and obtaining a user input with respect to the keypad and the at least one of the two logic values displayed as the candidate component values corresponding to the second variable.

The method may further include, after the displaying of the format of the syntax, obtaining a command for expanding one of the component corresponding to the first variable and the component corresponding to the second variable, and in response to the command for expanding, expanding the format of at least one of the component corresponding to the first variable and the component corresponding to the second variable, to include a component corresponding to a third variable, a component corresponding to a comparison operator, and a component corresponding to a fourth variable.

The method may further include, after the expanding, obtaining a command for contracting the component expanded according to the expanding, and in response to the command for contracting, contracting the expanded format of the component including the component corresponding to the third variable, the component corresponding to the comparison operator, and the component corresponding to the fourth variable, to only include a component corresponding to a seventh variable.

In the obtaining of the command for expanding, when the command for expanding both of the component corresponding to the first variable and the component corresponding to the second variable is obtained, in response to the command of expanding, the format of the component corresponding to the first variable may be expanded to include the component corresponding to the third variable, the component corresponding to the comparison operator, and the component corresponding to the fourth variable, and in response to the command of expanding, the format of the component corresponding to the second variable may be expanded to include a component corresponding to a fifth component, a component corresponding to a comparison operator, and a component corresponding to a sixth variable.

The method may further include, after the expanding, obtaining a command for contracting a format of the component corresponding to the first variable and a format of the component corresponding to the second variable, the components being expanded according to the expanding, and in response to the command of contracting, contracting the expanded format of the component corresponding to the first variable, the expanded format including the component corresponding to the third variable, the component corresponding to the comparison operator, and the component corresponding to the fourth variable, to only include a component corresponding to an eighth variable, and contracting the expanded format of the component corresponding to the second variable, the expanded format including the component corresponding to the fifth variable, the component corresponding to the comparison operator, and the component corresponding to the sixth variable, to only include a component corresponding to a ninth variable.

According to one or more embodiments of the disclosure, there is provided a robot control device that is coded according to a standardized coding format, the robot control device including a controller, wherein the controller displays a format of a syntax to be input in units of components, displays one or more candidate component values that are to be input as a value of each component with respect to each component in the syntax, and completes the syntax based on a user selection on the candidate component values with respect to each component.

The syntax to be input may be a syntax corresponding to a comparison expression for comparing values of at least two variables, the component may be one of an operator and a variable, and the operator may be one of comparison operators for comparing the values of the at least two variables.

A format of the syntax corresponding to the comparison expression may include a component corresponding to a first variable, a component corresponding to a comparison operator, and a component corresponding to a second variable.

The controller may display at least one variable generated in advance as a candidate component value for the component corresponding to the first variable, may display at least one comparison operator as a candidate component value for the component corresponding to the comparison operator, and may display a keypad for inputting a value of the second variable and at least one of two logic values as a candidate component value for the component corresponding to the second variable.

The controller may obtain a user input with respect to one of the one or more variables generated in advance, the one of the one or more variables being displayed as the candidate component value for the component corresponding to the first variable, may obtain a user input with respect to one of the one or more comparison operators represented as the candidate component values for the component corresponding to the comparison operator, and may obtain a user input with respect to the keypad and the at least one of the two logic values represented as the candidate component values corresponding to the second variable.

The controller may obtain a command for expanding one of the component corresponding to the first variable and the component corresponding to the second variable, and in response to the command for expanding, may expand the format of at least one of the component corresponding to the first variable and the component corresponding to the second variable, to include a component corresponding to a third variable, a component corresponding to a comparison operator, and a component corresponding to a fourth variable.

The controller may obtain a command for contracting the component expanded according to the command of expanding, and in response to the command for contracting, may contract the expanded format of the component including the component corresponding to the third variable, the component corresponding to the comparison operator, and the component corresponding to the fourth variable, to only include a component corresponding to a seventh variable.

The controller, when the command for expanding both of the component corresponding to the first variable and the component corresponding to the second variable is obtained, may expand the format of the component corresponding to the first variable to include the component corresponding to the third variable, the component corresponding to the comparison operator, and the component corresponding to the fourth variable, in response to the command of expanding, and may expand the format of the component corresponding to the second variable to include a component corresponding to a fifth component, a component corresponding to a comparison operator, and a component corresponding to a sixth variable, in response to the command of expanding.

The controller may obtain a command for contracting a format of the component corresponding to the first variable and a format of the component corresponding to the second variable, the components being expanded in response to the expanding command, in response to the command of contracting, may contract the expanded format of the component corresponding to the first variable, the expanded format including the component corresponding to the third variable, the component corresponding to the comparison operator, and the component corresponding to the fourth variable, to only include a component corresponding to an eighth variable, and may contract the expanded format of the component corresponding to the second variable, the expanded format including the component corresponding to the fifth variable, the component corresponding to the comparison operator, and the component corresponding to the sixth variable, to only include a component corresponding to a ninth variable.

Other aspects, features and advantages of the present invention will become better understood through the accompanying drawings, the claims and the detailed description.

Advantageous Effects of the Invention

According to one or more embodiments of the present disclosure, a coding method and program of a robot control device and the robot control device may be implemented, wherein the coding method and program are capable of reducing cases in which syntax is wrongly input, by completing the syntax based on 'selection' of a user, not 'writing' of the user, when inputting main syntaxes.

Also, a coding method and a program of a robot control device and the robot control device may be implemented, wherein the coding method and program are capable of performing a coding easily by displaying a predefined variable as a candidate value of a component corresponding to a variable in a syntax, and enabling a user to perform a coding of a robot without a particular training, by receiving a selection of each component after providing a syntax format even when the user does not know about rules and grammar of the coding.

BEST MODE

Figure 1:
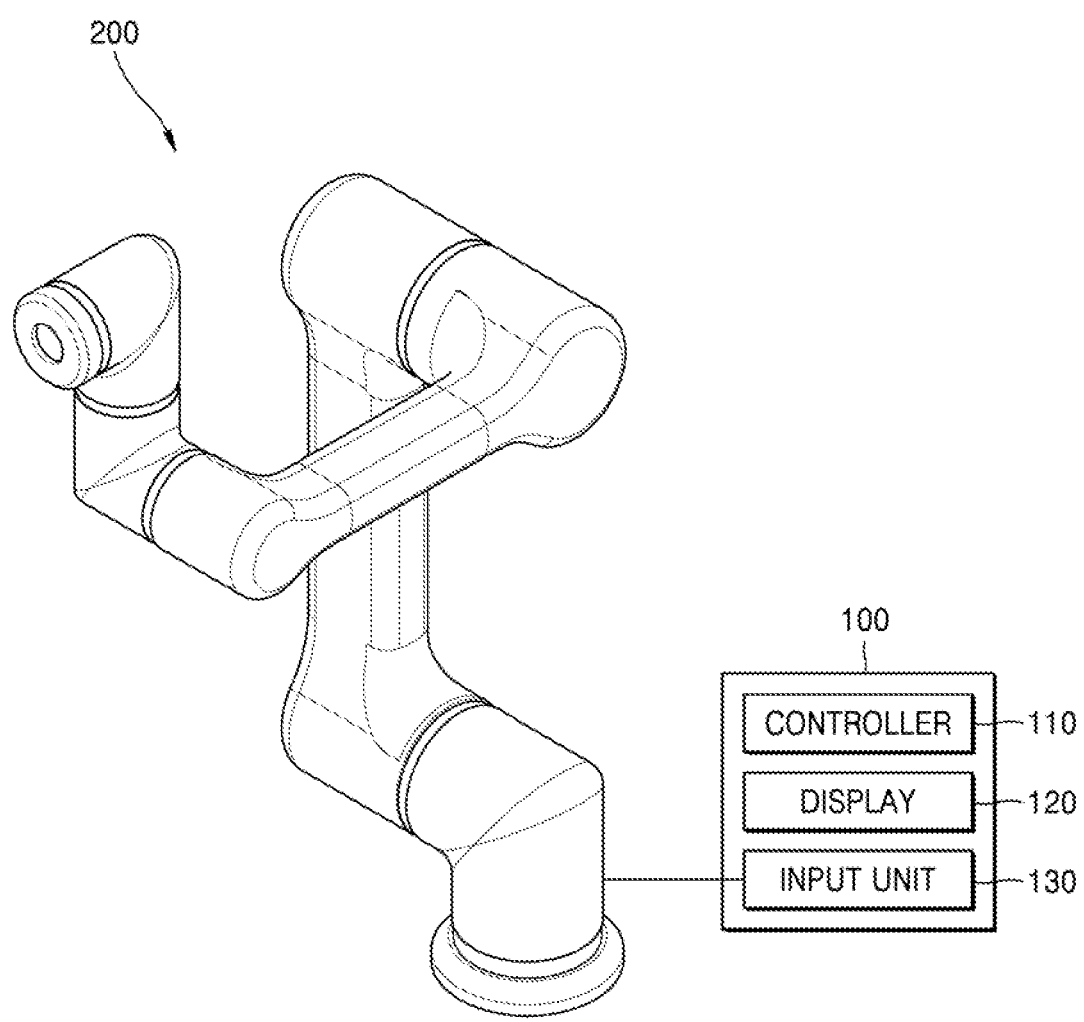
FIG. 1 is a schematic diagram of a robot system according to an embodiment of the present disclosure.

According to one or more embodiments of the disclosure, there is provided a method of coding a robot control device according to a standardized coding format, the method including displaying a format of a syntax to be input in units of components, with respect to each component configuring the syntax, displaying one or more candidate component values to be input as a value of each component, and completing the syntax based on a user selection on the candidate component values with respect to each component.

MODE OF THE INVENTION

As the present disclosure allows for various changes and numerous embodiments, particular embodiments will be illustrated in the drawings and described in detail in the written description. However, this is not intended to limit the present disclosure to particular modes of practice, and it is to be appreciated that all modifications, equivalents, and/or alternatives that do not depart from the spirit and technical scope are encompassed in the disclosure. In the description, certain detailed explanations of the related art are omitted when it is deemed that they may unnecessarily obscure the essence of the present disclosure.

It will be understood that although the terms "first," "second," etc. may be used herein to describe various components, these components should not be limited by these terms. Terms are only used to distinguish one element from other elements.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the present disclosure may be represented as functional block structures and various processing stages. The functional blocks may be implemented as variety numbers hardware and/or software configurations executing certain functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the inventive concept may be implemented with any programming or scripting language such as C, C++, Java, assembler language, or the like, with the various algorithms being implemented with any combination of data structures, objects, processes, routines or other programming elements. The functional aspects may be implemented in algorithms that are executed on one or more processors. Also, the present disclosure may employ any number of conventional techniques for electronics configuration, signal processing and/or control, data processing and the like. The words "mechanism," "element," "means," and "configuration" are used broadly and are not limited to mechanical or physical embodiments. The above terms may include software routines in conjunction with processors, etc.

FIG. 1 is a schematic diagram of a robot system according to an embodiment of the present disclosure.

Referring to FIG. 1, the robot system according to an embodiment of the present disclosure may include a robot control device 100 and a robot 200.

According to the present disclosure, the robot 200 may be a device including one or more actuators and one or more parts. Here, the actuators may denote various devices converting electrical energy to kinetic energy based on a control signal. For example, the actuator may be one of a direct current (DC) servo motor, an alternating current (AC) servo motor, a stepping motor, a linear motor, a hydraulic cylinder, a hydraulic motor, a pneumatic cylinder, and a pneumatic motor. However, the scope of the present disclosure is not limited to the above examples.

In addition, the part may denote a structure for fixing the actuator at a certain location, or a structure that is moved by being fixed on the actuator.

The robot according to the embodiment may be one of, for example, an articulated robot, a Scara robot, and a cylindrical coordinated robot. The articulated robot may include one or more joints and a part (or body) connecting a joint to another joint. The Scara robot may be a robot having an arm operating within a certain plane. The cylindrical coordinated robot may be a robot having an arm that includes at least one revolute joint and at least one prismatic joint. However, the scope of the present disclosure is not limited to the above examples. Therefore, as described above, a device including at least one actuator and at least one part and operating according to a control signal may be a robot according to the present disclosure.

The robot control device 100 according to an embodiment of the present disclosure is a device for controlling and/or manipulating a robot, and may include a controller 110, a display 120, and an input unit 130.

The controller 110 according to the embodiment may provide an interface enabling a user to perform a coding operation according to a standardized coding format. Here, the controller 110 may include all kinds of devices capable of processing data, e.g., a processor. Here, the 'processor' may denote a data processing device built in hardware, and includes a physically structured circuit for executing functions expressed as codes or commands included in a program. As an example of the data processing device built into the hardware, there may be a microprocessor, a central processing unit (CPU), a processor core, a multiprocessor, an application-specific integrated circuit (ASIC), a field programmable gate array (FPGA), etc., but the scope of the present disclosure is not limited thereto.

The display 120 according to the embodiment of the present disclosure may display a coding interface (that is, an interface enabling the user to code according to a standardized coding format), etc. generated by the controller 110. Therefore, the display 120 may denote a display apparatus for displaying figures, characters, or images. For example, the display 120 may include one of a cathode ray tube (CRT), a liquid crystal display (LCD), a plasma display panel (PDP), a light-emitting diode (LED), and an organic light-emitting diode (OLED), but the scope of the present disclosure is not limited thereto.

The input unit 130 according to the embodiment may receive a user input according to the coding interface displayed on the display 120. Accordingly, the input unit 130 according to the embodiment may include various units for receiving the user input. For example, the input unit 130 may include one of a keyboard, a mouse, a trackball, a microphone, and a button, or a combination thereof.

In addition, the input unit 130 may further include a touch sensing unit for performing an input operation on the display 120. However, the scope of the present disclosure is not limited to the above examples.

Although not shown in the drawings, the robot control device 100 according to the embodiment may further include a communicator (not shown) and a memory (not shown).

Here, the communicator (not shown) may be a device including hardware and software necessary for the robot control device 100 to transmit and receive the control signal to/from an external device such as the robot 200 via wired/wireless connection.

The memory (not shown) temporarily or permanently store data processed by the robot control device 100. For example, the memory (not shown) may store signals transmitted from the external device via the input unit 130. The signals stored in the memory (not shown) may be used to control motions of the robot 200. Here, the memory may include magnetic storage media or flash storage media, but is not limited thereto.

In addition, the robot control device 100 according to the embodiment may be separately provided from the robot 200 and/or a control device (not shown) of the robot 200, as shown in the drawings. Alternately, the robot control device 100 may be included in the robot 200 and/or the control device (not shown) of the robot 200, unlike in the drawings.

In other words, the robot 200 or the control device (not shown) of the robot 200 may perform the method of controlling the robot according to the embodiment of the present disclosure. However, it will be assumed that the robot control device 100 is separately provided as shown in FIG. 1 for convenience of description.

Hereinafter, a method in which the robot control device 100 provides a user with a coding interface and completes an input syntax based on an input of the user will be described below.

The controller 110 of the robot control device 100 according to the embodiment of the present disclosure may represent a format of a syntax to be input in a component unit.

In the present disclosure, 'syntax' may denote an instruction phrase for controlling operations of a robot. For example, the syntax may include a comparison statement for comparing two variables, an iteration statement for repeatedly performing an operation until a certain condition is satisfied, and a selection statement for performing various operations according to one of a plurality of values corresponding to a certain variable value.

In the present disclosure, 'component' may denote each element configuring the syntax. For example, when the syntax is a comparison statement, a first component may denote a component corresponding to a first variable that is a comparison target, a second component may be a component corresponding to an operator for comparison, and a third component may denote a component corresponding to a second variable that is to be compared with the first variable. As described above, in a case where the syntax is a comparison statement, each of the components in the syntax of the operator may be the operator or one of the variables. Here, the operator may be one of comparison operators for comparing values of two or more variables.

In addition, in the present disclosure, 'format' may denote arrangement of components in the syntax. For example, when the syntax is a comparison statement, an order of the components in the syntax may be [a component corresponding to a first variable, a component corresponding to a comparison operator, and a component corresponding to a second variable].

Hereinafter, it will be assumed that the syntax is a comparison statement for convenience of description. However, the scope of the present disclosure is not limited thereto.

Figure 2:
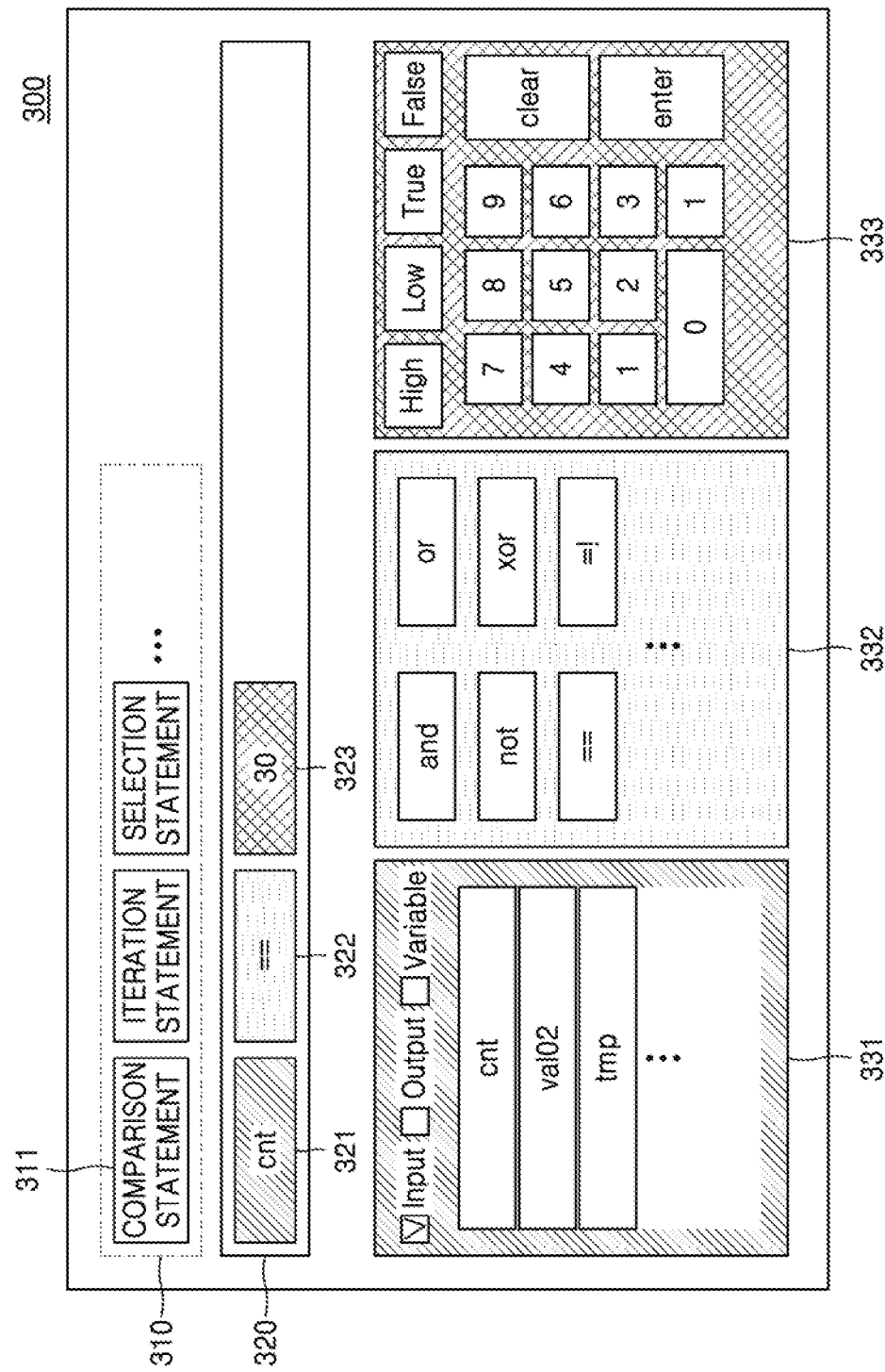
FIG. 2 is a diagram showing an example of a screen displaying a comparison statement format according to an embodiment of the present disclosure.

FIG. 2 is a diagram showing an example of a screen 300 displaying a format of a comparison statement according to an embodiment of the present disclosure.

Referring to FIG. 2, the screen 300 may include a region 310 for selecting a kind of a syntax to be input, a region 320 displaying a format of a selected syntax, and regions 331, 332, and 333 displaying candidate components for each of the components in the format.

FIG. 2 shows an example, in which a comparison statement 311 is selected in the region 310 of selecting the kind of the syntax, and it may be identified that the comparison statement format is represented in the region 320 of displaying the format of selected syntax. In other words, it may be identified that the region 320 displaying the format of the selected syntax displays [a component 321 corresponding to a first variable, a component 322 corresponding to a comparison operator, and a component 323 corresponding to a second variable].

Also, it is identified that one of values represented as candidate components is input to each of the components 321, 322, and 323 based on a user input. That is, 'cnt', that is, one of the values represented as the candidate components is input as a value of the component 321 corresponding to the first variable. Also, '=' that is one of the values represented as the candidate components for the comparison operator is input as a value of the component 322 corresponding to the comparison operator. Also, '30' that is one of the values represented as the candidate components for the second variable is input as a value of the component 323 corresponding to the second variable.

According to the related art, a user writes or corrects the syntax by using an input unit such as a keyboard. According to the method of the related art, the user may freely correct the syntax, whereas a possibility of generating an error in inputting syntax increases. If a user enters an undefined variable or different variable as a variable to be compared, or enters an inappropriate operator, an error occurs.

When such an error is revealed as a malfunction of a robot during actual performance of the robot, without being detected during a compile process or a debugging process, the error may cause a severe accident or a great loss due to distinctive characteristic of the robot.

According to the present disclosure, when inputting main syntaxes, the syntax is completed based on 'selection' of the user, not 'writing' of the user, in order to reduce probability of mis-inputting the syntax. Moreover, a predefined variable is represented by a candidate value of a component corresponding to the variable in the syntax, the coding may be performed easy. In addition, even when a user does not know about rules and grammars of the coding, a format of syntax is provided to the user to enable the user to simply select each component, and thus, the user may possibly code a robot without being educated.

Figure 3:
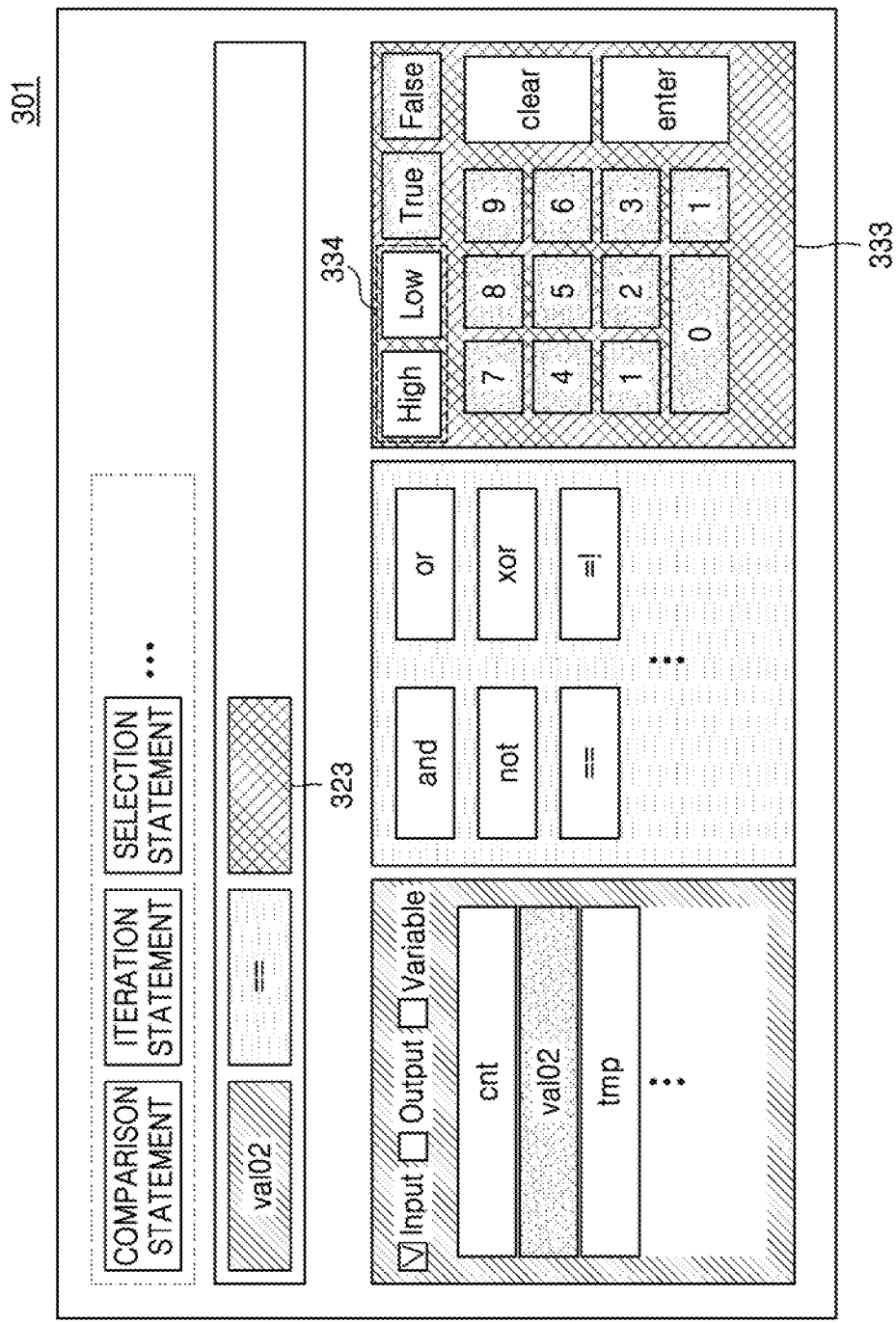
FIG. 3 is a diagram showing an example of a screen displaying candidate components for a second variable taking into account a type of a first variable, according to an embodiment of the present disclosure.

To do this, the controller 110 according to the embodiment of the present disclosure may represent one or more candidate component values that may be input as the values of the components 321, 322, and 323 in the syntax as shown in FIG. 3, in the regions 331, 332, and 333 of displaying the candidate components.

For example, when the syntax is a comparison statement as shown in FIG. 2, the controller 110 may display, in the region 331 of displaying the candidate component, at least one variable that is generated in advance as a candidate component value for the component 321 corresponding to the first variable. Similarly, the controller 110 may display, in the region 332 of displaying the candidate component, at least one comparison operator as a candidate component value for the component 322 corresponding to the comparison operator. Also, the controller 110 may display, in the region 333 displaying the candidate component, a keypad for inputting a value of the second variable and at least one of two logic values as a candidate component value for the component 323 corresponding to the second variable.

In addition, the controller 110 according to the embodiment of the present disclosure may only display a candidate component value corresponding to a type of the first variable, from among the candidate component values for the component 323 corresponding to the second variable, as a candidate component value of the component 323 corresponding to the second variable in the region 333 displaying the candidate component. In other words, the controller 110 may display the candidate component of the component 323 corresponding to the second variable, taking into account the type of the first variable.

FIG. 3 is a diagram showing an example of a screen 301 displaying a candidate component for the second variable, taking into account the type of the first variable, according to an embodiment of the present disclosure.

As described above, the controller 110 may display the candidate component of the component 323 corresponding to the second variable, taking into account the type of the first variable.

For example, it will be assumed that val02 is selected as the first variable and val02 is a variable for storing a logic signal (a signal having only one of logic high and logic low values).

In this case, the controller 110 according to the embodiment may only activate input of a candidate component 334 that may be a value of the first variable, and deactivate input that into of the other components, in the region 333 displaying the candidate component of the second variable.

As such, more accurate input of the syntax may be guided taking into account the type of the first variable, according to the present disclosure.

Referring back to FIG. 2, the controller 110 according to the embodiment of the present disclosure may complete the syntax based on a user's selection on each of the components 321, 322, and 323. In other words, the controller 110 complete the part of the component 321 corresponding to the first variable, by obtaining the user input with respect to one of at least one variable that is generated in advance, wherein the at least one variable is represented as the candidate component value of the component 321 corresponding to the first variable. Also, the controller 110 may complete the part of the component 322 corresponding to the comparison operator, by obtaining a user input with respect to one of at least one comparison operator that is represented as the candidate component value for the component 322 corresponding to the comparison operator. Also, the controller 110 may complete the part of the component 323 corresponding to the second variable, by obtaining a user input with respect to the keypad and at least one of the two logic values that are represented as the candidate component value for the component corresponding to the second variable. Here, 'completion' of the syntax may denote determination and input of the value of each component in the syntax.

Accordingly, as shown in FIG. 2, as the value of the component 321 corresponding to the first variable, 'cnt' that is one of values represented as candidate components for the first variable, as the value of the component 322 corresponding to the comparison operator, '=' that is one of the values represented as the candidate component for the comparison operator, and as the value of the component 323 corresponding to the second variable, '30' that is one of the values represented as the candidate component for the second variable are input to complete the syntax.

As such, an error of the user in inputting the syntax may be reduced. Also, according to the present disclosure, the format of the syntax that the user wants to input and candidate values that may be input in each of the components of the format are displayed together, and thus, the coding may be performed easy and fast.

In addition, the controller 110 according to the embodiment may correct the format of the syntax provided through the above-described processes based on the user input.

Figure 4:
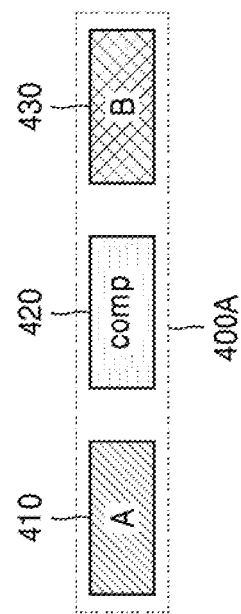
FIG. 4 shows an example of a comparison statement format according to an embodiment of the present disclosure.
Figure 5:
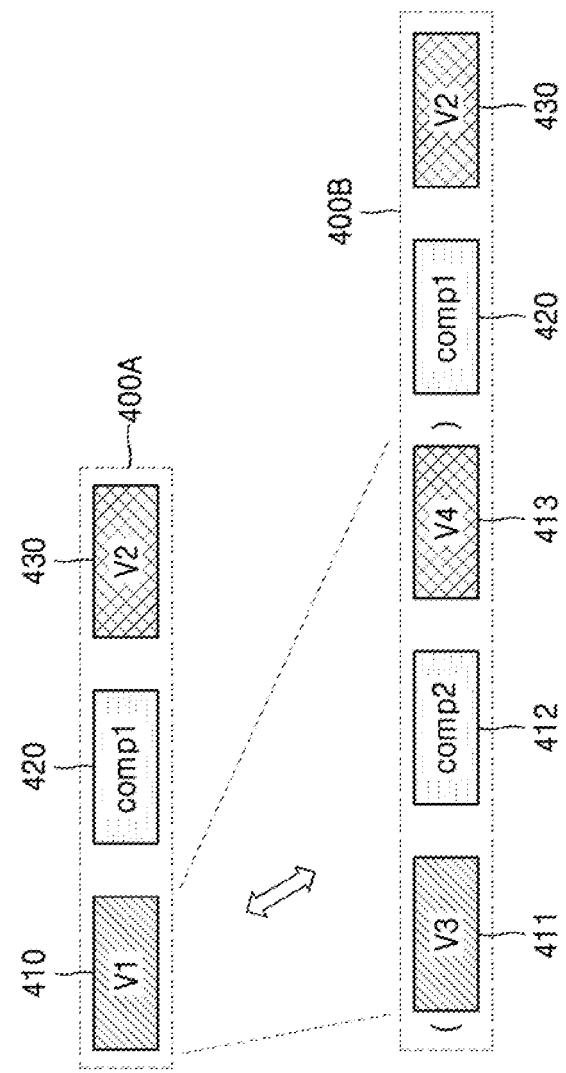
FIG. 5 shows an example of a format expanded (or contracted) by a controller.
Figure 6:
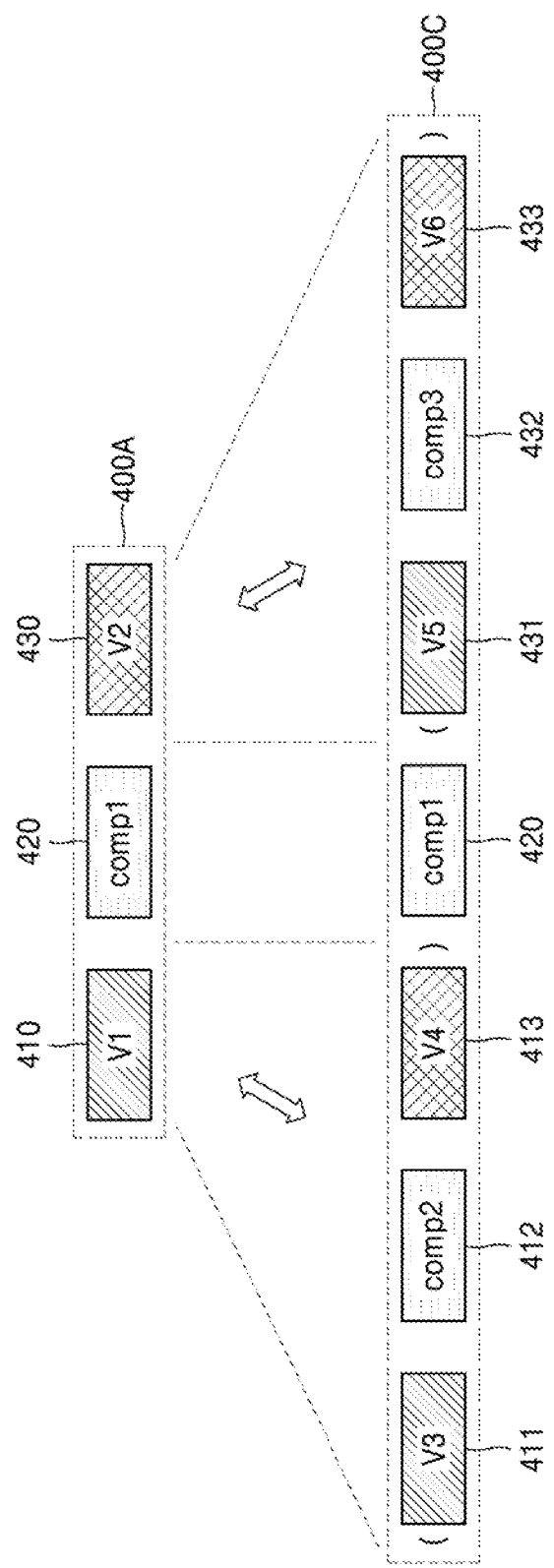
FIG. 6 shows another example of a format expanded (or contracted) by a controller.

FIGS. 4 to 6 are diagrams illustrating a method of correcting the format of a syntax according to an embodiment of the present disclosure.

FIG. 4 shows a comparison statement format 400A according to an embodiment of the present disclosure.

As shown in the drawing, the comparison statement format 400A may be equal to [a component 410 corresponding to a first variable, a component 420 corresponding to a comparison operator, and a component 430 corresponding to a second variable].

In addition, during coding processes of a robot, a multiple comparison statement may be necessary. In other words, a case in which a result of a first comparison statement is used as a variable in a second comparison statement may occur.

In this case, the controller 110 according to the embodiment of the present disclosure may represent a new format by expanding the displayed format 400A.

FIG. 5 is a diagram showing an example of the format 400A and a format 400B that is expanded (or contracted) by the controller 110.

The controller 110 according to the embodiment of the present disclosure may obtain a command for expanding one of the component 410 corresponding to the first variable and the component 420 corresponding to the second variable. Also, in response to the expand command, the controller 110 may expand the format of at least one of the component 410 corresponding to the first variable and the component 420 corresponding to the second variable, to include a component corresponding to a third variable, a component corresponding to the comparison operator, and a component corresponding to a fourth variable.

For example, when receiving a command for expanding the component 410 corresponding to the first variable, the controller 110 may expand the format of the component 410 corresponding to the first variable to include a component 411 corresponding to the third variable, a component 412 corresponding to the comparison operator, and a component 413 corresponding to the fourth variable.

Alternately, the controller 110 may contract the expanded format 400B into the prior format 400A, according to a command for contracting the expanded component. In other words, the controller 110 obtains a command for contracting the expanded components 411 to 413, and may contract the expanded component format 400B to only include a component 410 corresponding to a seventh variable, wherein the expanded component format 400B includes the component 411 corresponding to the third variable, the component 412 corresponding to the comparison operator, and the component 413 corresponding to the fourth variable.

As described above, according to the present disclosure, some components in the format may be expanded and/or contracted, and thus, a degree of freedom in the coding operation may be improved and the multiple syntaxes may be accurately input.

FIG. 6 is a diagram showing an example of the format 400A and a format 400C that is expanded (or contracted) by the controller 110.

As described above, the controller 110 according to the embodiment may expand or contract a certain component according to the command for expanding or contracting the corresponding component.

In addition, the controller 110 according to the embodiment of the present disclosure may expand or contract two or more components according to a command for expanding or contracting the two or more components.

For example, it will be assumed that the controller 110 obtains a command for expanding both of the component 410 corresponding to the first variable and the component 430 corresponding to the second variable. In this case, the controller 110 may expand the format of the component 410 corresponding to the first variable to include the component 411 corresponding to the third variable, the component 412 corresponding to the comparison operator, and the component 413 corresponding to the fourth variable. Also, the controller 110 may expand the format of the component 430 corresponding to the second variable to include a component 431 corresponding to a fifth variable, a component 432 corresponding to a comparison operator, and a component 433 corresponding to a sixth variable.

In a case of contraction, the controller 110 obtains a command for contracting the expanded format of the component corresponding to the first variable and the format of the component corresponding to the second variable, and then contracts the expanded format of the component corresponding to the first variable, the component including the component 411 corresponding to the third variable, the component 412 corresponding to the comparison operator, and the component 413 corresponding to the fourth variable, to only include a component 410 corresponding to an eighth variable. Also, the controller 110 may contract the expanded format of the component corresponding to the second variable, the component including the component 431 corresponding to the fifth variable, the component 432 corresponding to the comparison operator, and the component 433 corresponding to the sixth variable, to only include the component 430 corresponding to a ninth variable.

As described above, a plurality of components may be simultaneously expanded and/or contracted according to the present disclosure, and thus, repeated input operations during the coding may be reduced.

Figure 7:
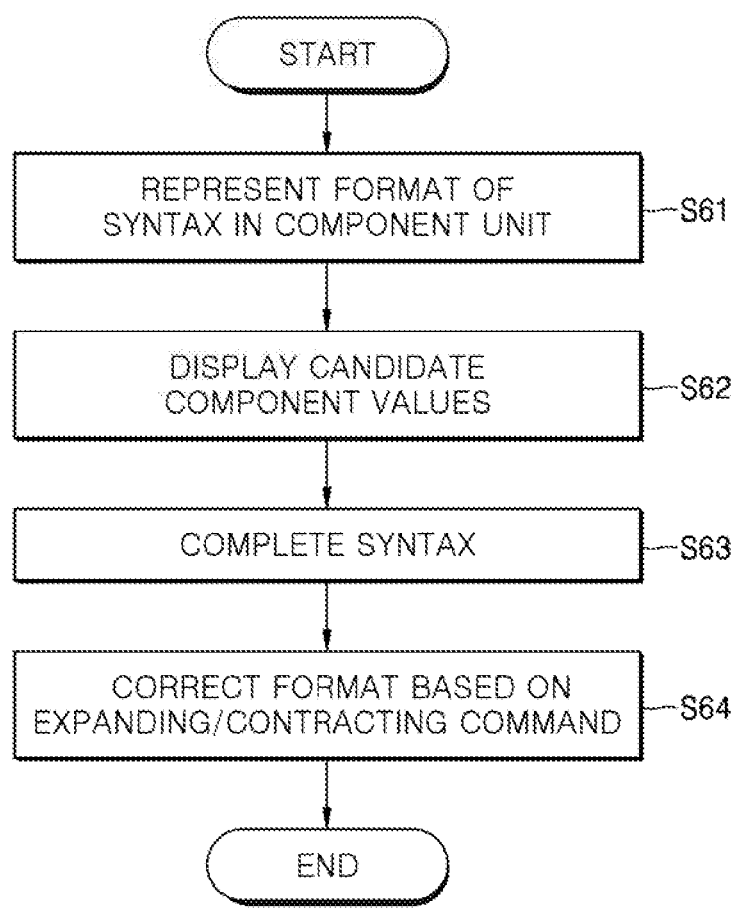
FIG. 7 is a flowchart illustrating a method of coding a robot control device, performed by the robot control device of FIG. 1.

FIG. 7 is a flowchart illustrating a method of coding a robot control device performed by the robot control device 100 of FIG. 1. Hereinafter, detailed descriptions provided above with reference to FIGS. 1 to 6 will be omitted.

The robot control device 100 according to the embodiment of the present disclosure may represent a format of a syntax to be input in a component unit (S61).

Referring back to FIG. 2, a screen 300 may a region 310 for selecting a kind of a syntax to be input, a region 320 displaying a format of the selected syntax, and regions 331, 332, and 333 displaying candidate components for each component in the format.

FIG. 2 shows an example, in which the comparison statement 311 is selected in the region 310 of selecting the kind of syntax, and it is identified that a comparison statement format is displayed in the region 320 displaying the format of selected syntax. In other words, the region 320 displaying the format of selected format displays [the component 321 corresponding to the first variable, the component 322 corresponding to the comparison operator, and the component 323 corresponding to the second variable].

Also, it is identified that one of the values represented as candidate components is input in each of the components 321, 322, and 323 based on a user input. That is, it is identified that 'cnt' that is one of the values represented as candidate components for the first variable is input as a value of the component 321 corresponding to the first variable. Also, it is identified that '==' that is one of the values represented as candidate components for the comparison operator is input as a value of the component 322 corresponding to the comparison operator. Also, it is identified that '30' that is one of the values represented as candidate components for the second variable is input as a value of the component 323 corresponding to the second variable.

According to the related art, a user writes or corrects syntaxes by using an input unit such as a keyboard. According to the above method, the user may freely correct the syntax, whereas a possibility of generating errors in inputting syntax increases. If a user enters an undefined variable or different variable as a variable to be compared, or enters an inappropriate operator, an error occurs.

When such an error is revealed as a malfunction of a robot during actual performance of the robot, without being detected during a compile process or a debugging process, the error may cause a severe accident or a great loss due to distinctive characteristic of the robot.

According to the embodiments of the present disclosure, cases in which syntax is wrongly input may be reduced by completing the syntax based on 'selection' of a user, not 'writing' of the user, when inputting main syntaxes. Moreover, a predefined variable is represented as a candidate value of a component corresponding to the variable in the syntax, and thus, the coding may be performed easy. In addition, when the user does not know about rules and grammars of the coding, the format of the syntax is provided to enable the user to simply select each component, and thus, the coding of a robot may be possible without a particular education.

To do this, the robot control device 100 according to an embodiment of the present disclosure may display one or more candidate component values in the regions 331, 332, and 333 of displaying candidate components, wherein the one or more candidate component values may be input as values of the components 321, 322, and 323 configuring the syntax as shown in FIG. 2 (S62).

For example, when the syntax is a comparison states as shown in FIG. 2, the robot control device 100 may display at least one variable generated in advance in the region 331 of displaying the candidate component as a candidate component value of the component 321 corresponding to the first variable. Similarly, the robot control device 100 may display at least one comparison operator in the region 332 of displaying the candidate component as a candidate component value of the component 322 corresponding to the comparison operator. Also, the robot control device 100 may display a key pad for inputting a value of the second variable and at least one of two logic values in the region 333 of displaying the candidate component, as a candidate component value of the component 323 corresponding to the second variable.

In addition, the robot control device 100 according to the embodiment of the present disclosure may complete the syntax based on the user selection on the candidate component value with respect to each of the components 321, 322, and 323 (S63). In other words, the robot control device 100 may complete the component 321 corresponding to the first variable by obtaining a user input with respect to one of at least one variable that is generated in advance, wherein the at least one variable is represented as the candidate component value for the component 321 corresponding to the first variable. Also, the robot control device 100 may complete the component 322 corresponding to the comparison operator, by obtaining a user input with respect to one of at least one comparison operator that is represented as the candidate component value for the component 322 corresponding to the comparison operator. Also, the robot control device 100 may complete the component 323 corresponding to the second variable, by obtaining a user input with respect to the keypad and at least one of the two logic values represented as the candidate component values for the component corresponding to the second variable. Here, 'completion' of the syntax may denote determining and inputting the value of each component configuring the syntax.

Accordingly, as shown in FIG. 2, as the value of the component 321 corresponding to the first variable, 'cnt' that is one of values represented as candidate components for the first variable, as the value of the component 322 corresponding to the comparison operator, '==' that is one of the values represented as the candidate component for the comparison operator, and as the value of the component 323 corresponding to the second variable, '30' that is one of the values represented as the candidate component for the second variable are input to complete the syntax.

As such, an error of the user in inputting the syntax may be reduced. Also, according to the present disclosure, the format of the syntax that the user wants to input and candidate values that may be input in each of the components of the format are displayed together, and thus, the coding may be performed easy and fast.

In addition, the format of the syntax provided through the above-described processes may be corrected based on the expanding/contracting command of the user (S64).

As shown in FIG. 4, the comparison statement format 400A may be equal to [a component 410 corresponding to a first variable, a component 420 corresponding to a comparison operator, and a component 430 corresponding to a second variable].

In addition, during coding processes of a robot, a multiple comparison statement may be necessary. In other words, a case in which a result of a first comparison statement is used as a variable in a second comparison statement may occur. In this case, the robot control device 100 according to the embodiment of the present disclosure may represent a new format by expanding the displayed format 400A.

Referring back to FIG. 5, the robot control device 100 according to the embodiment of the present disclosure may obtain a command for expanding one of the component 410 corresponding to the first variable and the component 420 corresponding to the second variable. Also, in response to the expand command, the robot control device 100 may expand the format of at least one of the component 410 corresponding to the first variable and the component 420 corresponding to the second variable, to include a component corresponding to a third variable, a component corresponding to the comparison operator, and a component corresponding to a fourth variable.

For example, when receiving a command for expanding the component 410 corresponding to the first variable, the robot control device 100 may expand the format of the component 410 corresponding to the first variable to include a component 411 corresponding to the third variable, a component 412 corresponding to the comparison operator, and a component 413 corresponding to the fourth variable.

Alternately, the robot control device 100 may contract the expanded format 400B into the prior format 400A, according to a command for contracting the expanded component. In other words, the robot control device 100 obtains a command for contracting the expanded components 411 to 413, and may contract the expanded component format 400B to only include a component 410 corresponding to a seventh variable, wherein the expanded component format 400B includes the component 411 corresponding to the third variable, the component 412 corresponding to the comparison operator, and the component 413 corresponding to the fourth variable.

As described above, according to the present disclosure, some components in the format may be expanded and/or contracted, and thus, a degree of freedom in the coding operation may be improved and the multiple syntaxes may be accurately input.

Referring to FIG. 6, the robot control device 100 according to an embodiment of the present disclosure may expand or contract both of two or more components according to a command for expanding or contracting two or more components.

For example, it will be assumed that the robot control device 100 obtains a command for expanding both of the component 410 corresponding to the first variable and the component 430 corresponding to the second variable. In this case, the robot control device 100 may expand the format of the component 410 corresponding to the first variable to include the component 411 corresponding to the third variable, the component 412 corresponding to the comparison operator, and the component 413 corresponding to the fourth variable. Also, the robot control device 100 may expand the format of the component 430 corresponding to the second variable to include a component 431 corresponding to a fifth variable, a component 432 corresponding to a comparison operator, and a component 433 corresponding to a sixth variable.

In a case of contraction, the robot control device 100 also obtains a command for contracting the expanded format of the component corresponding to the first variable and the format of the component corresponding to the second variable, and then contracts the expanded format of the component corresponding to the first variable, the component including the component 411 corresponding to the third variable, the component 412 corresponding to the comparison operator, and the component 413 corresponding to the fourth variable, to only include a component 410 corresponding to an eighth variable. Also, the robot control device 100 may contract the expanded format of the component corresponding to the second variable, the component including the component 431 corresponding to the fifth variable, the component 432 corresponding to the comparison operator, and the component 433 corresponding to the sixth variable, to only include the component 430 corresponding to a ninth variable.

As described above, a plurality of components may be simultaneously expanded and/or contracted according to the present disclosure, and thus, repeated input operations during the coding may be reduced.

The coding method according to the present disclosure may be implemented as computer-readable codes in a computer-readable recording medium. The computer readable recording medium is any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the present disclosure may be easily construed by programmers skilled in the art to which the present disclosure pertains.

While one or more embodiments have been described with reference to the figures, it will be understood by those of ordinary skill in the art that various changes in form and details may be made therein without departing from the spirit and scope as defined by the following claims.

The invention claimed is:

1. A method of coding a robot control device according to a standardized coding format, the method comprising:
    displaying a format of a syntax to be input in units of components;
    with respect to each component configuring the syntax, displaying one or more candidate component values to be input as a value of each component; and
    completing the syntax based on a user selection on a user interface on the candidate component values with respect to each component to generate a code for the robot control device,
    wherein the syntax to be input is a syntax corresponding to a comparison expression for comparing values of at least two variables,
    wherein a format of the syntax corresponding to the comparison expression comprises a component corresponding to a first variable, a component corresponding to a comparison operator, and a component corresponding to a second variable,
    wherein the displaying the format of the syntax comprises:
        displaying at least one variable generated in advance as a candidate component value for the component corresponding to the first variable,
        displaying at least one comparison operator as a candidate component value for the component corresponding to the comparison operator, and
        displaying on the user interface, from among candidate component values for the component corresponding to the second variable, only candidate component values corresponding to a type of the first variable based on the comparison operator as candidate component values for the component corresponding to the second variable that is compared with the first variable, and
    wherein the code is executed by the robot control device to perform an operation of a robot.

2. The method of claim 1, wherein the displaying of the candidate component values further comprises:
    displaying a keypad for inputting a value of the second variable and at least one of two logic values as the candidate component value for the component corresponding to the second variable.

3. The method of claim 2, wherein the completing of the syntax comprises:
    obtaining a user input on the user interface with respect to one of one or more variables generated in advance, the at least one variable being expressed as the candidate component value for the component corresponding to the first variable;
    obtaining a user input on the user interface with respect to one of the one or more comparison operators displayed as the candidate component values for the component corresponding to the comparison operator; and
    obtaining a user input on the user interface with respect to the keypad and the at least one of the two logic values displayed as the candidate component values corresponding to the second variable.

4. The method of claim 1, further comprising, after the displaying of the format of the syntax:
    obtaining a command for expanding one of the component corresponding to the first variable and the component corresponding to the second variable; and
    in response to the command for expanding, expanding the format of at least one of the component corresponding to the first variable and the component corresponding to the second variable, to include a component corresponding to a third variable, a second component corresponding to a second comparison operator, and a component corresponding to a fourth variable.

5. The method of claim 4, further comprising, after the expanding:
    obtaining a command for contracting the component expanded according to the expanding; and
    in response to the command for contracting, contracting the expanded format of the component including the component corresponding to the third variable, the component corresponding to the comparison operator, and the component corresponding to the fourth variable, to only include a component corresponding to a seventh variable.

6. The method of claim 4, wherein, in the obtaining of the command for expanding, when the command for expanding both of the component corresponding to the first variable and the component corresponding to the second variable is obtained, in response to the command of expanding, the format of the component corresponding to the first variable is expanded to include the component corresponding to the third variable, the component corresponding to the comparison operator, and the component corresponding to the fourth variable, and in response to the command of expanding, the format of the component corresponding to the second variable is expanded to include a component corresponding to a fifth variable, a component corresponding to a comparison operator, and a component corresponding to a sixth variable.

7. The method of claim 6, further comprising, after the expanding:

obtaining a command for contracting a format of the component corresponding to the first variable and a format of the component corresponding to the second variable, the components being expanded according to the expanding; and in response to the command of contracting, contracting the expanded format of the component corresponding to the first variable, the expanded format including the component corresponding to the third variable, the component corresponding to the comparison operator, and the component corresponding to the fourth variable, to only include a component corresponding to an eighth variable, and contracting the expanded format of the component corresponding to the second variable, the expanded format including the component corresponding to the fifth variable, the component corresponding to the comparison operator, and the component corresponding to the sixth variable, to only include a component corresponding to a ninth variable.

8. A non-transitory computer-readable recording medium having recorded thereon a program, which when executed by a computer, performs the method according to claim 1.

9. A robot control device that is coded according to a standardized coding format, the robot control device comprising:

a processor; and
a display configured to display:
a format of a syntax to be input in units of components; and
one or more candidate component values that are to be input as a value of each component with respect to each component in the syntax,
wherein the processor is configured to complete the syntax based on a user selection on a user interface on the candidate component values with respect to each component to generate a code for the robot control device,
wherein the syntax to be input is a syntax corresponding to a comparison expression for comparing values of at least two variables,
wherein a format of the syntax corresponding to the comparison expression comprises a component corresponding to a first variable, a component corresponding to a comparison operator, and a component corresponding to a second variable,
wherein the display is further configured to display:

at least one variable generated in advance as a candidate component value for the component corresponding to the first variable,
at least one comparison operator as a candidate component value for the component corresponding to the comparison operator, and
displaying on the user interface, from among candidate component values for the component corresponding to the second variable, only candidate component values corresponding to a type of the first variable based on the comparison operator as candidate component values for the component corresponding to the second variable that is compared with the first variable, and
wherein the code is executed by the robot control device to perform an operation of a robot.

10. The robot control device of claim 9, wherein the display is further configured to display a keypad for inputting a value of the second variable and at least one of two logic values as the candidate component value for the component corresponding to the second variable.

11. The robot control device of claim 10, wherein the display is configured to receive a user input with respect to the keypad and the at least one of the two logic values represented as the candidate component values corresponding to the second variable.

12. The robot control device of claim 9, wherein the processor obtains a command for expanding one of the component corresponding to the first variable and the component corresponding to the second variable, and in response to the command for expanding, expands the format of at least one of the component corresponding to the first variable and the component corresponding to the second variable, to include a component corresponding to a third variable, a second component corresponding to a second comparison operator, and a component corresponding to a fourth variable.

13. The robot control device of claim 12, wherein the processor obtains a command for contracting the component expanded according to the command of expanding, and in response to the command for contracting, contracts the expanded format of the component including the component corresponding to the third variable, the component corresponding to the comparison operator, and the component corresponding to the fourth variable, to only include a component corresponding to a seventh variable.

14. The robot control device of claim 12, wherein the processor, when the command for expanding both of the component corresponding to the first variable and the component corresponding to the second variable is obtained, expands the format of the component corresponding to the first variable to include the component corresponding to the third variable, the component corresponding to the comparison operator, and the component corresponding to the fourth variable, in response to the command of expanding, and expands the format of the component corresponding to the second variable to include a component corresponding to a fifth variable, a component corresponding to a comparison operator, and a component corresponding to a sixth variable, in response to the command of expanding.

15. The robot control device of claim 14, wherein the processor obtains a command for contracting a format of the component corresponding to the first variable and a format of the component corresponding to the second variable, the components being expanded in response to the expanding command, in response to the command of contracting, contracts the expanded format of the component corresponding to the first variable, the expanded format including the component corresponding to the third variable, the component corresponding to the comparison operator, and the component corresponding to the fourth variable, to only include a component corresponding to an eighth variable, and contracts the expanded format of the component corresponding to the second variable, the expanded format including the component corresponding to the fifth variable, the component corresponding to the comparison operator, and the component corresponding to the sixth variable, to only include a component corresponding to a ninth variable.

* * * * *